Aug. 28, 1928.

L. MORRISON ET AL 1,682,182

CULTIVATOR ATTACHMENT

Filed Sept. 22, 1927

L. Morrison
J. O. Simmons
INVENTORS.

John M. Spellman
ATTORNEY

Patented Aug. 28, 1928.

1,682,182

UNITED STATES PATENT OFFICE.

LUCIAN MORRISON AND JAMES O. SIMMONS, SR., OF TROY, TEXAS.

CULTIVATOR ATTACHMENT.

Application filed September 22, 1927. Serial No. 221,189.

This invention relates to improvements in cultivator attachments, particularly for the cutting of grass and weeds from growing cotton and other plants.

More especially the invention relates to an attachment for cultivators for the cutting of weeds and grass by severing such vegetation at the roots and provides a simply arranged device whereby the undesirable vegetation is cut close to the plants being cultivated without injury to the latter. Further, the device may be attached to any standard cultivator.

In the drawings forming part of this specification:

Figure 2:
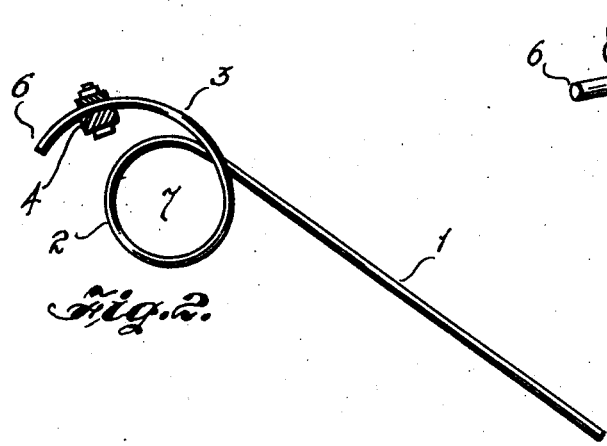
Figure 2 represents a side view of the attachment, the lower portion of the shank of the shovel or plow foot shown in cross-section.

In carrying out the invention, a steel rod 1 of specially treated and tempered steel of approximately one-fourth of an inch in diameter and about ten inches in length is coiled near one end to form a circular loop 2. Beyond the loop thus formed the remaining portion of the rod extends for approximately four inches and is curved into a semi-circle 3. The main portion of the rod 1 is straight, as shown in Figure 2. These rods are coiled and curved in this manner for making a set, two rods constituting a set. One rod is provided for each side of a cultivator, one loop being a right-turned loop and one loop turned to the left in constructing a set.

Figure 1:
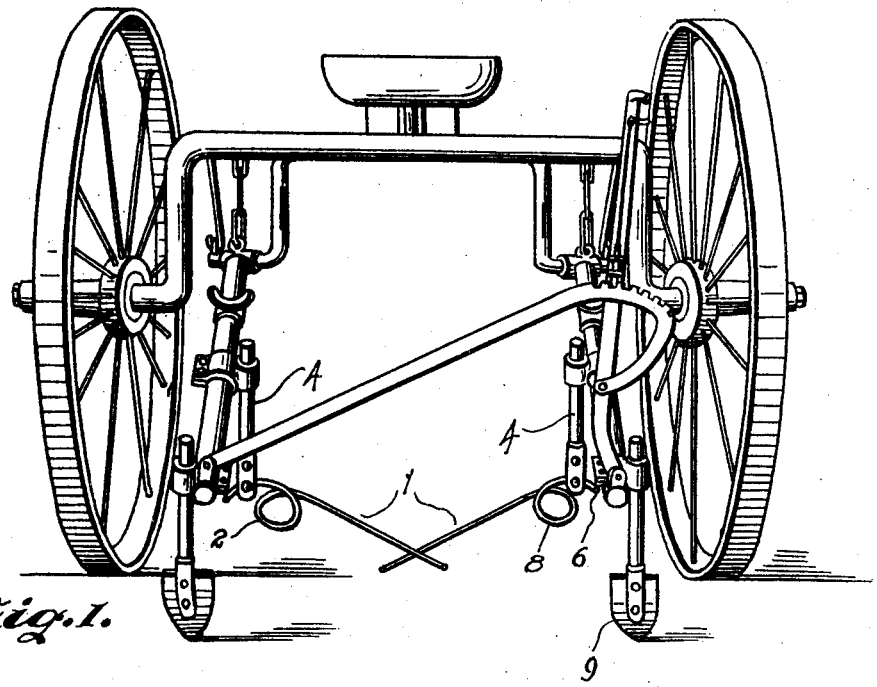
Figure 1 represents a rear elevational view of a cultivator, illustrating the improved weed and grass cutter attachment in position thereupon, the forward shovels of the cultivator not shown.
Figure 3:
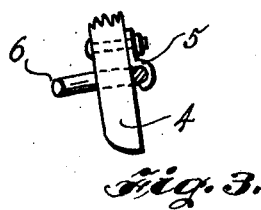
Figure 3 represents a sectional detail view of the lower end of the plow shank, the attachment being shown in cross-section and illustrating the manner of securing the attachment to the shank.

In Figures 1 and 3 the coils are shown attached to the lower end of a cultivator shank 4 by means of a clamp 5, bolted through the shank. In the drawing these rods are shown attached to the forward shovel shanks 4, the shovels not being shown as attached to the forward shanks for the sake of clearness, but the shovels in the front of the cultivator may remain in place if preferred.

When the rods are secured firmly in position, they cross one another and assume an inward oblique position with respect to the soil and the cultivator. Likewise, the looped portion 2 of the rod assumes an oblique position with respect to the ground, that is to say the space 7 formed by the loop portion 2 faces obliquely toward the soil, the edge 8 being on a slant. In this manner, the plows or shovels 9, one on each side of a row of cotton or other plants, when let into the ground, submerge the shanks 1 of the rods under the soil and as the cultivator is drawn through the field the grass and weeds are cut at their roots close to the plants. The stalks of the cotton plants push the rods apart as they come in contact therewith, so that they drag by the cotton stalks on either side and remove all of the grass and weeds close up to the plants. The pressure brought on the loop portion 2 of the rod provides sufficient force to cut the vegetation, yet is resilient enough caused by the loop, and its position, to permit the plants to pass between the stalks without injury to the latter.

Obviously the resilient effect obtained by the formation of the rod and the position of the rods may be modified in keeping with the appended claim.

What is claimed is:

An attachment for cultivators for destroying weeds and grass, comprising a pair of resilient rods adapted to be secured respectively to opposite cultivator beams, each of said rods having one end thereof substantially straight, the opposite end slightly curved, and an intermediate portion bent in the form of a loop, said curved end adapted to be detachably secured to said beam, the curve on said end being adjustably positioned to vary the angle between said rods, said straight end adapted to travel under the soil for destroying weeds and grass, said intermediate portion having the plane of its loop positioned at an angle oblique to the surface of the ground, said rods crossing each other adjacent the lower ends thereof.

In testimony whereof we affix our signatures.

LUCIAN MORRISON.
JAMES O. SIMMONS, Sr.